(12) United States Patent  
Gower

(10) Patent No.: US 7,519,215 B2  
(45) Date of Patent: Apr. 14, 2009

(54) SELECTION OF COMPONENT

(75) Inventor: Ian R. Gower, Chepstow (GB)

(73) Assignee: Rolls-Royce PLC, London (GB)

( * ) Notice: Subject to any disclaimer, the term of this patent is extended or adjusted under 35 U.S.C. 154(b) by 891 days.

(21) Appl. No.: 11/156,468

(22) Filed: Jun. 21, 2005

(65) Prior Publication Data

US 2006/0020432 A1    Jan. 26, 2006

(30) Foreign Application Priority Data

Jul. 9, 2004    (GB) .................................. 0415407.6  
May 13, 2005    (GB) .................................. 0509729.0

(51) Int. Cl.  
*G06K 9/00*    (2006.01)  
*G06F 19/00*    (2006.01)  
*G06F 17/50*    (2006.01)

(52) U.S. Cl. ............................. 382/141; 700/97; 703/1

(58) Field of Classification Search ................. 382/141, 382/150, 152; 700/97, 98, 131, 182, 233; 703/1, 21, 24; 716/5, 19; 717/123  
See application file for complete search history.

(56) References Cited

U.S. PATENT DOCUMENTS

2003/0016859 A1    1/2003    Weisgerber et al.

*Primary Examiner*—Abolfazl Tabatabai  
(74) *Attorney, Agent, or Firm*—Oliff & Berridge, PLC

(57) ABSTRACT

A method of selecting a component of optimal design comprising automated steps of a) measuring the periphery of at least part of said component; b) producing a 2D co-ordinate dataset (20) from said measurements; c) processing the 2D co-ordinate dataset (20) so as to produce a representation of characteristics of the periphery of the component; d) assigning a value to the difference between the characteristics of the periphery of the component and characteristics of a component of optimal design; and e) conducting a parametric analysis of the differences between the characteristics of the periphery of the component and the characteristics of a component of optimal design. The method further comprises the step of using the results of the parametric analysis to determine whether the component meets a predetermined criteria for acceptability.

16 Claims, 5 Drawing Sheets

SELECTION OF COMPONENT

This invention relates to a method of selecting a component.

In particular the invention concerns a method of selecting a component of optimal design by analysing differences between characteristics of the component and an optimum design of said component.

It is known to compare geometric measurements of manufactured components to an ideal or optimum design. However, in the case of components having critical design features, the significance of small geometric differences may not be easily assessed, and may lead to large and/or unacceptable differences in performance of the component in use.

By way of non limiting example, a gas turbine engine is made up of many components having critical design features. A gas turbine engine comprises a fan section, a compressor section and a turbine section, all of which contain annular arrays of aerodynamic rotor blades or stator vanes. Each of the rotor blades and stator vanes are of aerofoil cross-section shape and must, within acceptable limits, conform to their intended design. For example, each aerofoil has a leading edge designed with a complex geometry to deliver a specific effect. Deviations from the optimal design may result in large and undesirable reductions in performance, such as aerodynamic stall, compressor surge or a reduction in engine efficiency. During inspection of a manufactured aerofoil the significance of small geometric differences between the aerofoil as made and the design optimum may not be apparent to an inspector. That is to say it is difficult to assess whether deviations will lead to reduction in performance or will have no impact on the performance of the aerofoil and consequently on the gas turbine engine.

According to the present invention there is provided a method of selecting a component of optimal design comprising automated steps of:
a) measuring the periphery of at least part of said component;
b) producing a 2D co-ordinate dataset from said measurements;
c) processing the 2D co-ordinate dataset so as to produce a representation of characteristics of the periphery of the component;
d) parameterising the difference between the characteristics of the periphery of the component and characteristics of a component of optimal design;
e) conducting a parametric analysis of the differences between the characteristics of the periphery of the component and the characteristics of a component of optimal design;

the method further comprising the step of using the results of the parametric analysis to determine whether the component meets a predetermined criteria for acceptability.

Preferably the representation of the characteristics of the periphery of the component is produced by a process comprising the steps of:
a) selecting a region of interest on the periphery of the component as represented by the 2D co-ordinate dataset;
b) defining a spline through a data subset from the 2D co-ordinate dataset, whereby said data subset describes the region of interest on the surface of the component, said data subset having a start point S and a finish point F, which corresponds to features on the surface of the component a distance x apart along the surface of the component, and where a tangent to the spline at point S meets a tangent to the spline at point F at an angle $\omega$, and a normal to the tangent to the spline at point S intersects with a normal to the spline at point F at an angle $\alpha_{SF}$;
c) identifying a point P on the spline, where a tangent to the curve at point P is at an angle $DEV_1$ to a tangent to the spline at point S;
d) identifying a point Q on the spline where a tangent to the curve at point Q is at an angle $DEV_2$ to a tangent to the spline at point F;
e) calculating the average curvature of the spline $$\frac{\alpha_{SF} - (DEV_1 + DEV_2)}{x}$$

from point P to point Q;
f) calculating the instantaneous curvature along the length of the spline $d\alpha/dx$ from point P to point Q, where $\alpha$ is the total angle through which the curve has turned relative to the tangent to the spline at point S in a increment dx of the total curve length x;
g) producing a graphical representation of normalised curvature, $$\left(\frac{d\alpha}{dx}\right) \div \left(\frac{\alpha_{SF} - (DEV_1 + DEV_2)}{x}\right),$$

against x.

The invention is a method for selecting a component of optimal design, a method of manufacturing a component comprising the selection process described herein, the resultant component, a computer program product comprising code to carry out the selection process and a computer system adapted to carry out the selection process herein described. The present invention solves the problem associated with assessing the significance of geometric differences between a manufactured component and an optimum design of the same component by using parameters derived from the component geometry as a basis for comparison. The parameters highlight differences between the actual and the desired component geometry in regions where minor geometric difference may result in significant reductions in performance when the component is in use.

Preferably $DEV_1$ and/or $DEV_2$ has a value between about 5 degrees but no more than about 15 degrees.

Preferably $DEV_1$ and/or $DEV_2$ has a value of substantially about 10 degrees.

The value of $DEV_1$ and $DEV_2$ is chosen based on the curvature characteristic of the component in question. For example, for a component with largely straight sides with a small region a small value of $DEV_1$ and/or $DEV_2$ is chosen. For a component with sides having sides with a large degree of curvature, a large value of $DEV_1$ and/or $DEV_2$ is chosen. $DEV_1$ and/or $DEV_2$ may be equal in value or may have different values depending on the components geometry.

Preferably the parametric analysis comprises determining the closeness of fit between the representation of characteristics of the periphery of the component and the representation of a set of characteristics of a component of optimal design.

Preferably the parametric analysis comprises determining the difference between peak values of normalised curvature representing characteristics of the periphery of the component and the peak values of normalised curvature representing characteristics of a component of optimal design.

Preferably the parametric analysis comprises determining the difference in value of peaks of normalised curvature representing characteristics of the periphery of the component.

Preferably the component is an aerofoil or the like.

Preferably the component is an aerofoil or the like for a gas turbine engine.

Preferably the region of interest is the trailing and/or leading edge of an aerofoil for a gas turbine engine.

In embodiments where the component is an aerofoil for a gas turbine engine, fitted into, by way of non limiting example, a fan system, compressor unit or turbine section, the geometry of the leading edge and trailing edge are critical to the performance of those assemblies. Aerofoils which deviate from the design ideal may cause stall, surge or a reduction of engine efficiency during operation of the engine. Hence a method, system or computer program which assists in the selection of components made to the correct geometry will assist in supplying engines that meet their operational requirements without the need for costly and time consuming component replacement. Replacing non optimal engine components may result in re-validating engine performance prior to being delivered to a customer which is time consuming and costly. Hence it is important to ensure a component of correct design is fitted first time. Given the large number of critical components in a device such as a gas turbine engine an automated selection process as herein described will be of particular benefit. An automated system will accelerate the assessment and selection and ensure consistency of decisions.

Preferably the measurements of the periphery of the component are obtained using a co-ordinate measuring machine. In the example of an aerofoil for a gas turbine engine, measurements of the aerofoil is used to derive parameters that quantify the deviation of the aerofoil from an optimum design.

By way of non limiting example, a leading edge of an aerofoil is identified by a user as a region of interest. The aerofoil is measured and a spline is fitted to the co-ordinate points of interest. Along the length of the region of interest, x, the average curvature from a start point to an end point is calculated, as is the instantaneous curvature along the arc length x. Values of normalised curvature, derived by dividing instantaneous curvature by average curvature, are plotted against x. Flats on the aerofoil are represented on the plot as regions of low normalised curvature, whereas the arcuate portions are represented as peaks of normalised curvature. By virtue of the mathematical equations employed, a longer flat will cause the height of the peaks to be larger, and the position of the flat around the leading edge will dictate the relative magnitude of the peaks. This representation of the features of a manufactured aerofoil is compared to a geometric design ideal, processed in the same way, thereby enabling easy comparison of critical geometric features, and hence enabling the selection of a component having critical features manufactured to optimal design.

For a better understanding of the present invention and to show how it may be carried into effect, reference will now be made by way of example to the corresponding drawings in which.

Figure 1:
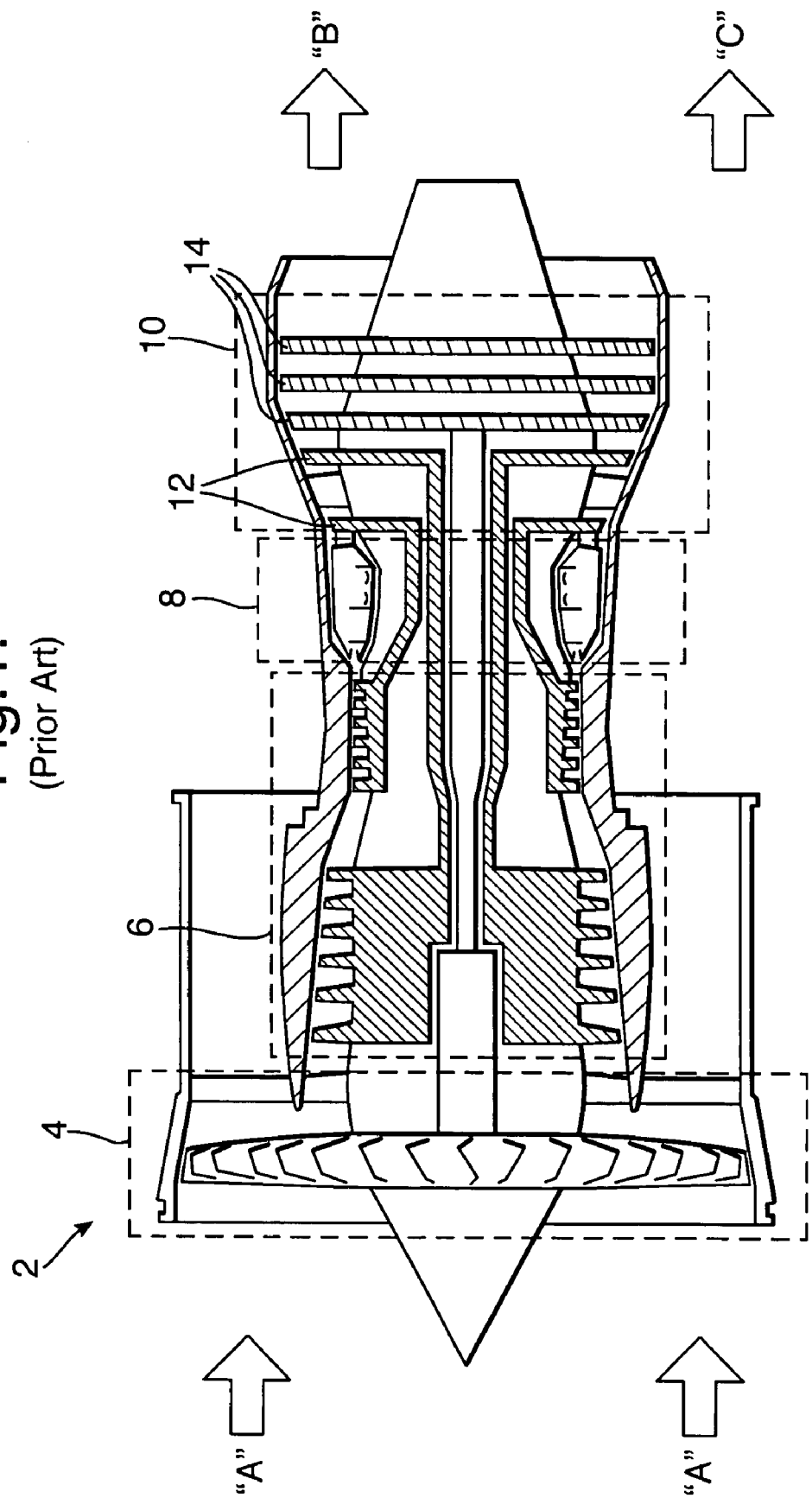
FIG. 1 (PRIOR ART) is a pictorial representation of a gas turbine engine comprising a number of aerofoils.

FIG. 1 illustrates the main sections of a gas turbine engine 2. The overall construction and operation of the engine 2 is of a conventional kind, well known in the field, and will not be described in this specification beyond that necessary to gain an understanding of the invention. For the purposes of this description the engine is divided up into four sections—a fan section 4, a compressor section 6, a combustor section 8 and a turbine section 10, the turbine section 10 comprising high pressure turbine 12 and a low pressure turbine 14. Air, indicated generally by arrow "A", enters the engine 2 and is compressed by the fan 4 before moving downstream to the compressor 6. The compressor further pressurises the air, a proportion of which enters the combustion section 8, the remainder of the air being employed elsewhere. Fuel is injected into the combustor airflow, which mixes with air and ignites before exhausting out of the rear of the engine, indicated generally by arrow "B", via the turbine section 10. The high pressure turbine 12 powers the compressor 6 and the low pressure 14 turbine powers the fan 4.

The fan 4, compressor 6 and turbine 10 typically comprise annular arrays of large fan blade rotors and smaller compressor and turbine rotor blades, the blades normally being interspaced with annular arrays of static aerodynamic guide vanes (commonly referred to as stator vanes). Each adjacent pair of rotor blades and stator vanes is referred to as a stage. Each of the rotor blades and stator vanes is aerofoil shaped and must, within acceptable limits, conform to its intended design.

Figure 2:
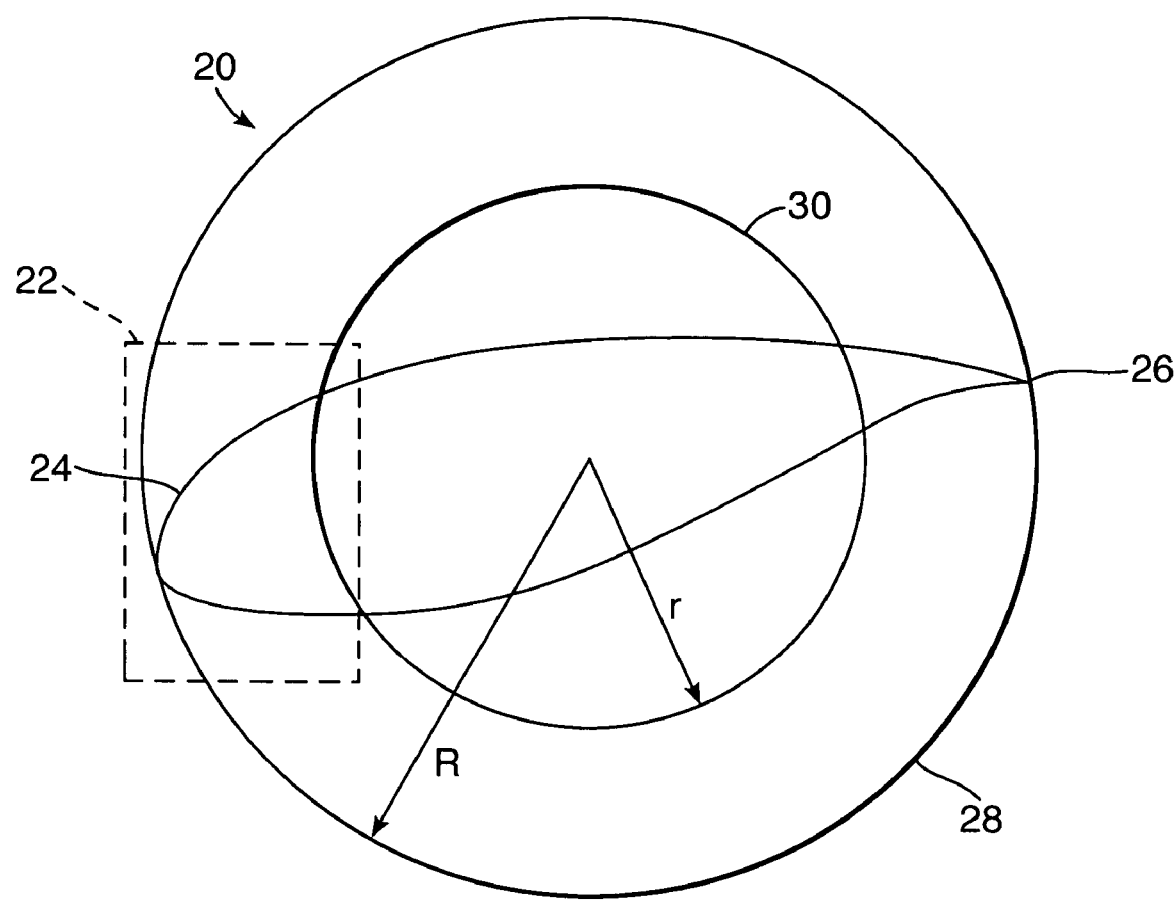
FIG. 2 shows a profile of an aerofoil with critical features, according to the present invention.

Referring now to FIG. 2, and in accordance with the present invention, after or during manufacture each, or a sample, of the aerofoil shaped rotor blades and stator vanes are measured to produce a two dimensional (2D) dataset 20 representing the periphery of the component. The component may be measured around its periphery at a plurality of locations, thereby generating a "stack" of 2D datasets which describe the 3D surface of the component. The component may be measured with a Co-ordinate Measuring Machine (CMM) or the like. The aerofoil component 2D dataset 20 shown in FIG. 2 represents a component having critical geometric features including, but not limited to, rotor blades or stator vanes. The 2D dataset 20 is processed to produce a graphical representation of the characteristics of periphery of the component under scrutiny. That is to say, parameters are derived from the co-ordinate data in the 2D dataset 20 which are used to represent critical features of the component design.

A region of interest, that is to say a region comprising critical features, is defined. In this example the region of interest of the 2D dataset is the data subset 22 corresponding to co-ordinates defining the leading edge 24 of the aerofoil 2D dataset 20. The data subset 22 is isolated by first identifying the co-ordinate centroid of the aerofoil profile and constructing a circumcircle 28 of radius R around the periphery of the aerofoil, touching the leading edge 24 and trailing edge 26, the circumcircle 28 having the centroid co-ordinate as its centre. A second circle 30 of radius k×R is constructed, where a user defined value k is less than 1 and typically has a value of 0.95. The second circle 30 also has the centroid co-ordinate as its centre. The region of interest comprising a data subset 22, comprises all the points at the leading edge 24 between R and R-r having length x, where $$x = \sum_{1}^{n} dx_n,$$

$dx_n$ being the distance between each of the n co-ordinate points making up the data subset 22.

Figure 3:
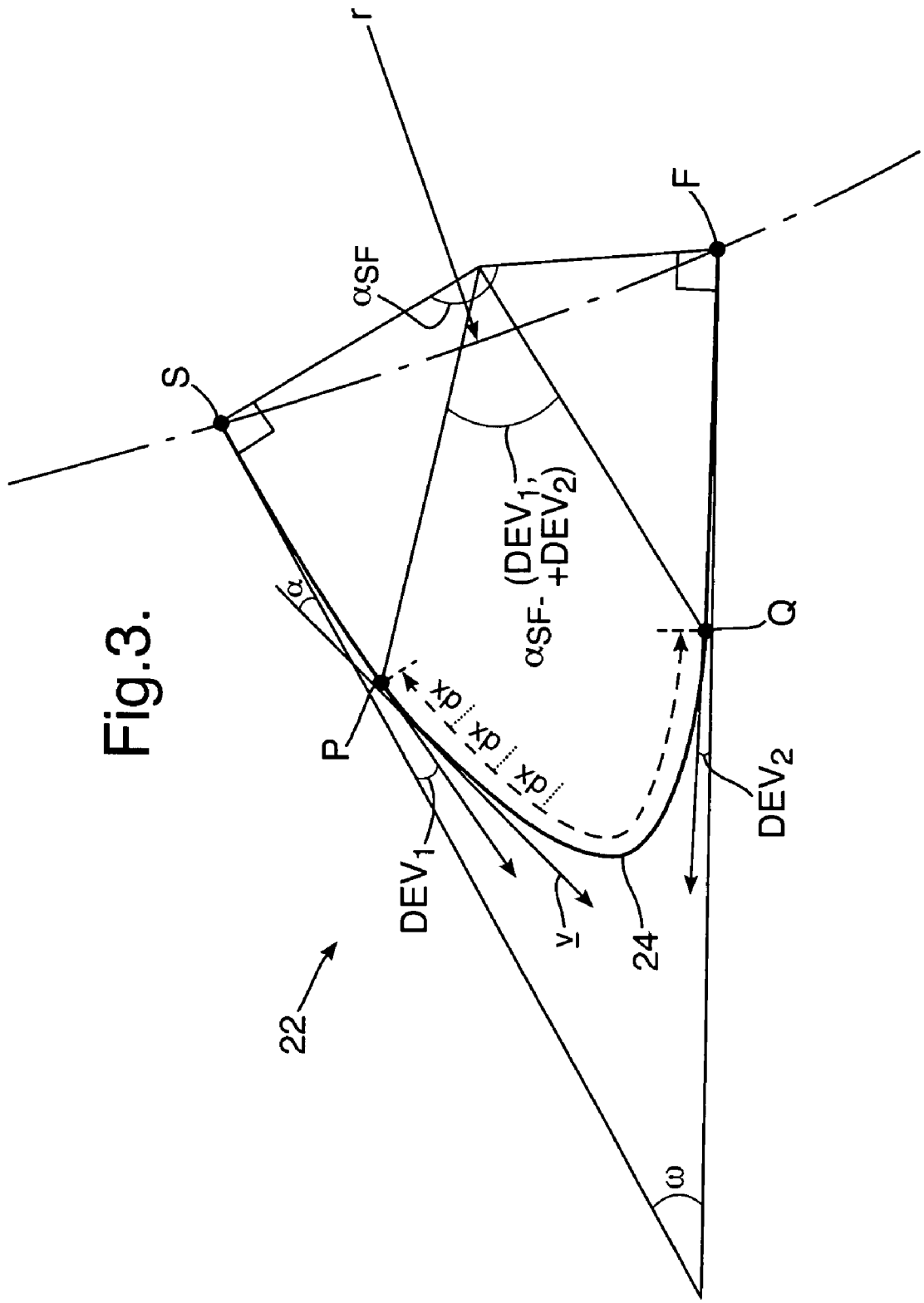
FIG. 3 shows a spline fitted through data points defining the leading edge of the aerofoil as shown in FIG. 2.

Referring to FIG. 3, the data subset 22 is defined with a start point S and a finish point F. A spline is fitted through all points of the data subset 22, thereby increasing the resolution of the data representing the component. A tangent to the spline at point S meets a tangent to the spline at point F at an angle ω, and a normal to the tangent of the spline at point S intersects with a normal to the spline at point F at an angle $\alpha_{SF}$.

Only data pertaining to a region of curvature is of interest and hence a point P on the spline, where a tangent to the spline at point P is at an angle $DEV_1$ to a tangent to the spline at point S is identified, this being the point where the rate of change of curvature of the spline becomes significant.

A point Q on the spline where the rate of change of curvature of the spline drops below a significant value is defined as being where a tangent to the curve is at an angle $DEV_2$ to a tangent to the spline at point F.

The value of $DEV_1$ and $DEV_2$ is dependent upon the component geometry, but typically they have a value between about 5 degrees but no more than about 15 degrees and typically substantially about 10 degrees.

The distance around the arc from point P to point Q is x. A vector v defines the direction of the tangent to the curve defining the leading edge 24 where the vector v is a function of the distance between adjacent co-ordinate points, dx, and an angle α of deviation between a vector v and a tangent to the spline at point S.

A plot of instantaneous spline curvature at all of the co-ordinate points normalised against average splined curvature is plotted against x, where:

$$\text{Average curvature} = \frac{\alpha_{SF} - (DEV_1 + DEV_2)}{x}, \text{ and}$$

$$\text{Instantaneous curvature} = \frac{d\alpha}{dx}.$$

The relationship between instantaneous curvature normalised against average curvature is also produced for an optimal design of component, and compared against the plot for the spline/manufactured component. Two such plots are presented in FIG. 4 in which the graphical representation of the characteristics of the periphery of the manufactured component, plot "C" is shown with a plot of the characteristics of a component of optimal or acceptable design, plot "D".

The plots exaggerate the critical features of the component under scrutiny. Flats on the leading edge have a value of low normalised curvature. Where the curvature is high there are peaks of high normalised curvature. Hence in this example the two regions of curvature are separated by a flat region, which is characterised by two peaks of normalised curvature between which is a trough of low curvature.

The difference between the manufactured "C" and the optimal design "D" plots is parameterised. This is done by assessing the deviation of plot "C" from plot "D" which may be done mathematically by any suitable method such as, by way of non limiting example, determining the closeness of fit of plot "C" to plot "D". A parametric analysis of the differences between the two plots is executed, during which it is assessed whether the differences are acceptable given a number of issues, which include but are not limited to the size of the deviations, the criticality of the feature and the position of the component in the engine. If plot "C" deviates from plot "D" by more than a predetermined acceptable value in region defined as critical, then the component is rejected.

Figure 4:
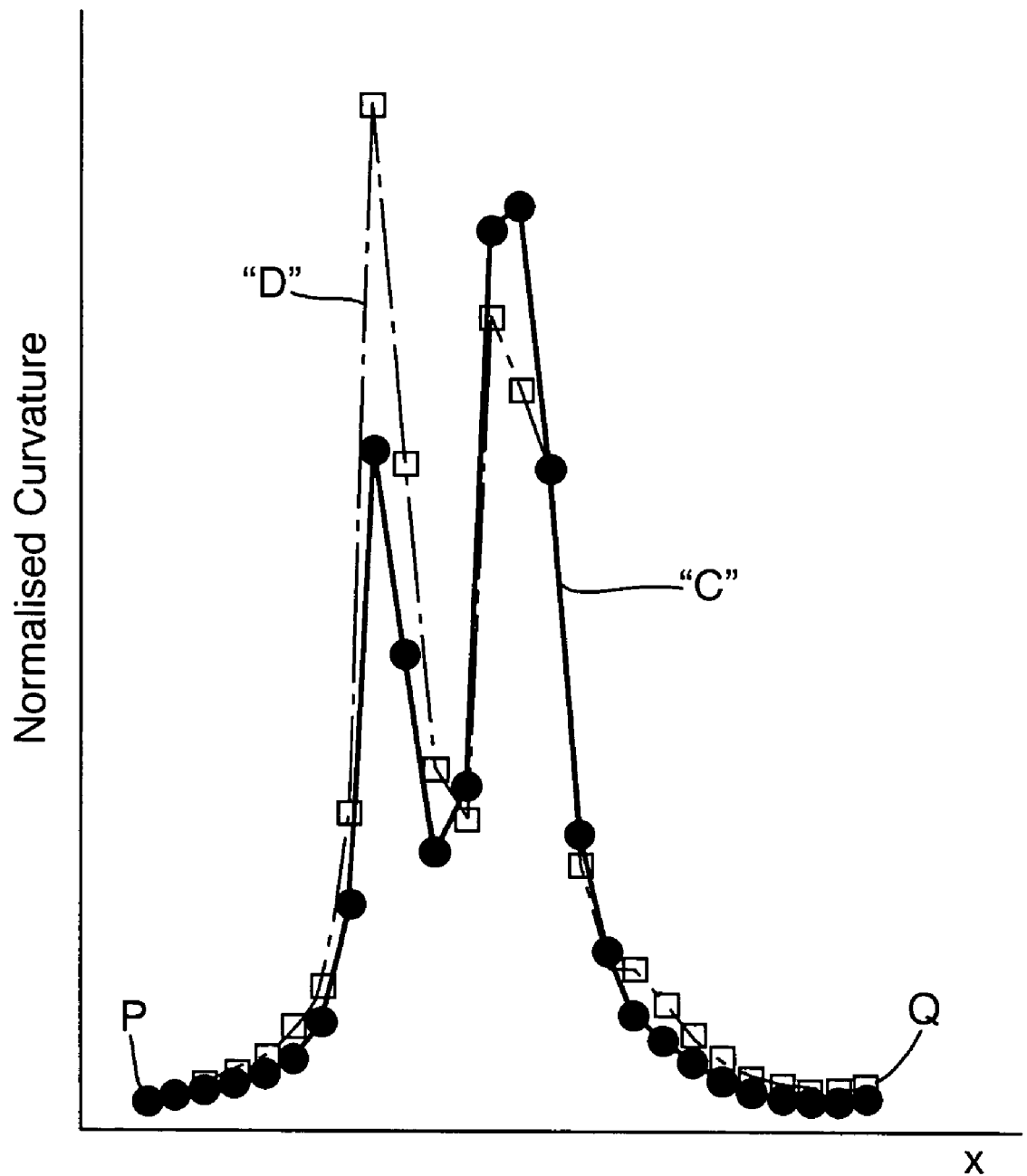
FIG. 4 is a plot of normalised curvature of the leading edge of the aerofoil graphical representation shown in FIG. 2 and FIG. 3.

Alternatively a parametric analysis of the normalised curvature plots is achieved by comparing the peak values of normalised curvature relative to values of normalised curvature calculated to produce acceptable performance. Hence, for the component presented in FIG. 3, acceptable values of peak normalised curvature of plot "C" in FIG. 4 are determined based on knowledge of an acceptable deviation from the optimum curvature characteristic of plot "D".

Figure 5:
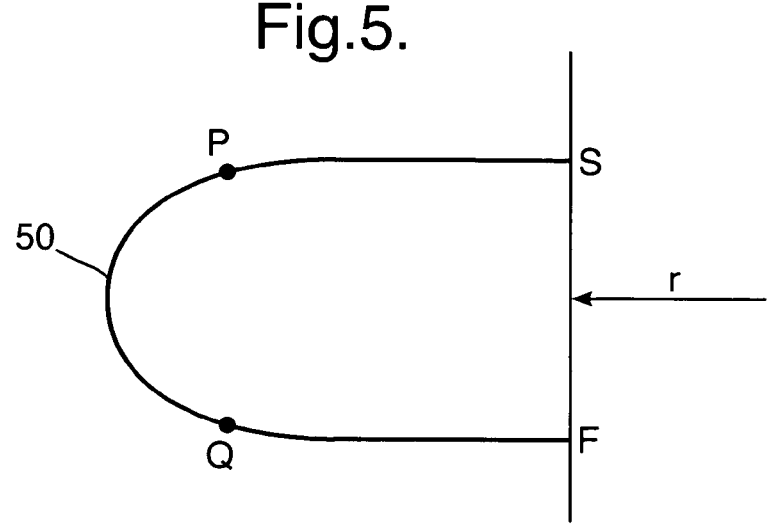
FIG. 5 shows a view of a leading edge profile of an aerofoil different to that shown in FIG. 2 and FIG. 3.
Figure 6:
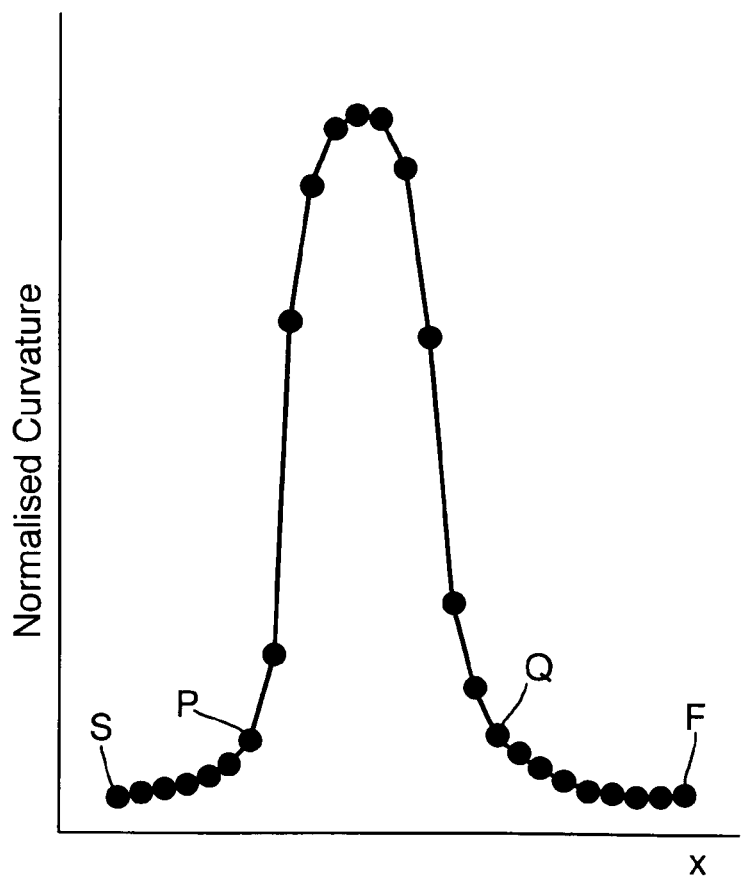
FIG. 6 is a plot of normalised curvature of the leading edge of the aerofoil graphical representation shown in FIG. 5.

Shown in FIG. 5 is a profile of leading edge 50 of an alternative aerofoil embodiment, with a corresponding curvature characteristic presented in FIG. 6. The points at which the curvature of the profile changes are identified as P and Q in FIG. 5, which are identified in FIG. 6. Flats on the leading edge (for example, from S to P and from Q to F) have values of low normalised curvature and there is a rapid change in curvature at either end of the flat. The leading edge in this embodiment is of slightly changing curvature from P to Q, and is presented as such in FIG. 6. Acceptable peak values of the normalised curvature are determined based on experience of an acceptable deviation from the optimum curvature characteristic.

Other parameters may be used to determine the acceptability of the aerofoil, including, but not limited to, the number of distinct curvature peaks and the difference in value of peaks of normalised curvature between peaks of the same dataset. That is to say, in FIG. 4 the number of peaks is 2 and the difference in value between the peaks is used as a basis for determining acceptability of the aerofoil.

An added advantage of the present invention is that since the curvature characteristic is calculated as normalised curvature, the size of the aerofoil is irrelevant. Deviations in thickness of manufactured aerofoils nominally to the same design affect absolute curvature values, making it necessary for a user to determine acceptability criteria for each individual aerofoil. The present invention provides a method where the curvature is normalised, and so acceptability criteria for a specific design of aerofoil need to be determined only once.

Hence this parametric analysis permits the acceptability of a manufactured component to be assessed so a component of optimal design can be identified for use in an engine. Components which deviate from the design ideal may cause operational problems when in use. Hence a method, system or computer program which assists in the selection of components made to the correct geometry will enable a more efficient supply of products that meet their operational requirements without the need for costly and time consuming component replacement. Replacing non optimal engine components may result in re-validating engine performance prior to being delivered to a customer, which is time consuming and costly. Hence it is important to ensure a component of correct design is fitted first time. Given the large number of critical components in a device such as a gas turbine engine an automated selection process as described herein will be of particular benefit. An automated system according to the present invention will accelerate the assessment and selection and will ensure consistency of decisions since it will obviate the need for human intervention, thereby reducing error due to human judgement.

To aid an auditing process parametric data and decisions are stored.

Any component may be the subject of the selection method herein described and the invention need not be limited to the field of gas turbine engines.

The method described herein may form part of a computer program product comprising code to carry out the steps necessary to select a component of optimal design. The method described herein may also form part of a computer system adapted to carry out the steps necessary to select a component of optimal design. The steps employed to select the optimal design of a component may also be used as part of a method of manufacturing a component.

It will be appreciated by one skilled in the art that the datasets hereinbefore described may comprise a plurality of different data types comprising at least a 2D co-ordinate data describing the profile of the component.

The configurations and data shown in FIGS. 1 to 6 are diagrammatic. The component under interrogation, its orientation, configuration and the data type being captured may vary.

The invention claimed is:

1. A method of selecting a component of optimal design comprising automated steps of:
   a) measuring the periphery of at least part of said component;
   b) producing a 2D co-ordinate dataset from said measurements;
   c) processing the 2D co-ordinate dataset so as to produce a representation of characteristics of the periphery of the component;
   d) assigning a value to the difference between the characteristics of the periphery of the component and characteristics of a component of optimal design;
   e) conducting a parametric analysis of the differences between the characteristics of the periphery of the component and the characteristics of a component of optimal design;

the method further comprising the step of using the results of the parametric analysis to determine whether the component meets a predetermined criteria for acceptability.

2. A method as claimed in claim 1 wherein the representation of the characteristics of the periphery of the component is produced by a process comprising the steps of:
   a) selecting a region of interest on the periphery of the component as represented by the 2D co-ordinate dataset;
   b) defining a spline through a data subset from the 2D co-ordinate dataset, whereby said data subset describes the region of interest on the surface of the component, said data subset having a start point S and a finish point F, which corresponds to features a distance x apart along the surface of the component, and where a tangent to the spline at point S meets a tangent to the spline at point F at an angle $\omega$, and a normal to the tangent to the spline at point S intersects with a normal to the spline at point F at an angle $\alpha_{SF}$;
   c) identifying a point P on the spline, where a tangent to the curve at point P is at an angle $DEV_1$ to a tangent to the spline at point S;
   d) identifying a point Q on the spline where a tangent to the curve at point Q is at an angle $DEV_2$ to a tangent to the spline at point F;
   e) calculating the average curvature of the spline $$\frac{\alpha_{SF} - (DEV_1 + DEV_2)}{x}$$

from point P to point Q;
   f) calculating the instantaneous curvature along the length of the spline $d\alpha/dx$ from point P to point Q, where $\alpha$ is the total angle through which the curve has turned relative to the tangent to the spline at point S in a increment dx of the total curve length x;
   g) producing a graphical representation of normalised curvature, $$\left(\frac{d\alpha}{dx}\right) \div \left(\frac{\alpha_{SF} - (DEV_1 + DEV_2)}{x}\right),$$

against x.

3. A method as claimed in claim 2 wherein $DEV_1$ and/or $DEV_2$ has a value of substantially about 10 degrees.

4. A method as claimed in claim 2 wherein the region of interest is the trailing edge or leading edge of an aerofoil for a gas turbine engine.

5. A method as claimed in claim 1 wherein $DEV_1$ and/or $DEV_2$ has a value between about 5 degrees but no more than about 15 degrees.

6. A method as claimed in claim 1 wherein the parametric analysis comprises determining the closeness of fit between the representation of characteristics of the periphery of the component and the representation of a set of characteristics of a component of optimal design.

7. A method as claimed in claim 1 wherein the parametric analysis comprises determining the difference between peak values of normalised curvature representing characteristics of the periphery of the component and the peak values of normalised curvature representing characteristics of a component of optimal design.

8. A method as claimed in claim 1 wherein the parametric analysis comprises determining the difference in value of peaks of normalised curvature representing characteristics of the periphery of the component.

9. A method as claimed in claim 1 wherein the component is an aerofoil or the like.

10. A method as claimed in claim 1 wherein the component is an aerofoil or the like for a gas turbine engine.

11. A method as claimed in claim 1 wherein the measurements of the periphery of the component are obtained using a co-ordinate measuring machine.

12. A method as claimed in claim 1 wherein the method further comprises the step of recording the results of the parametric analysis.

13. A component selected by a method in accordance with claim 1.

14. A component manufactured by a method comprising the steps of selecting a component of optimal design in accordance with claim 1.

15. A computer-readable medium embodying a computer program comprising code for carrying out a method in accordance with claim 1.

16. A computer system adapted to carry out a method in accordance with claim 1.

* * * * *